US010341505B2

(12) United States Patent
Yamamoto

(10) Patent No.: US 10,341,505 B2
(45) Date of Patent: Jul. 2, 2019

(54) CONTROLLER, CALIBRATION CONTROL PROGRAM, AND CALIBRATION CONTROL METHOD

(71) Applicant: KONICA MINOLTA, INC., Chiyoda-ku, Tokyo (JP)

(72) Inventor: Tomoko Yamamoto, Machida (JP)

(73) Assignee: Konica Minolta, Inc., Chiyoda-ku, Tokyo (JP)

(*) Notice: Subject to any disclaimer, the term of this patent is extended or adjusted under 35 U.S.C. 154(b) by 0 days.

(21) Appl. No.: 15/831,931

(22) Filed: Dec. 5, 2017

(65) Prior Publication Data
US 2018/0183946 A1 Jun. 28, 2018

(30) Foreign Application Priority Data

Dec. 26, 2016 (JP) ................. 2016-250406

(51) Int. Cl.
H04N 1/00 (2006.01)
H04N 1/60 (2006.01)

(52) U.S. Cl.
CPC ......... *H04N 1/00087* (2013.01); *H04N 1/603* (2013.01); *H04N 1/6033* (2013.01)

(58) Field of Classification Search
CPC .. H04N 1/603; H04N 1/6033; H04N 1/00278; H04N 1/00347; H04N 1/1008; H04N 1/2307; H04N 1/233; H04N 1/2338; H04N 1/2361; H04N 1/32502; H04N 1/32529; H04N 1/506; H04N 1/58; H04N 1/6005; H04N 1/6008; H04N 1/6019; H04N 1/6022; H04N 1/6027; H04N 1/6052;

(Continued)

(56) References Cited

U.S. PATENT DOCUMENTS 5,933,676 A 8/1999 Ohno
6,176,572 B1 * 1/2001 Kato ................... B41J 2/17513
347/87

(Continued)

FOREIGN PATENT DOCUMENTS

JP H 10-063047 A 3/1998
JP 3814342 B2 8/2006
JP 2014-059490 A 4/2014

*Primary Examiner* — Negussie Worku

(74) *Attorney, Agent, or Firm* — Buchanan Ingersoll & Rooney PC

(57) ABSTRACT

Provided is a controller including an image processor and an image forming device, both performing calibration, and the controller includes a hardware processor that: associates first calibration data indicating a first calibration result with second calibration data indicating a second calibration result, and stores the first and second calibration data; compares the obtained first calibration data with the stored first calibration data, and determines whether the stored first calibration data includes data equal to the obtained first calibration data; and, when there is no data equal to the obtained first calibration data, creates the second calibration data to be associated with the obtained first calibration data by performing the second calibration, and, when there is data equal to the obtained first calibration data, creates the second calibration data to be associated with the obtained first calibration data, using the second calibration data stored and associated with the equal data.

21 Claims, 14 Drawing Sheets

(58) Field of Classification Search
CPC .. H04N 1/6058; H04N 1/6075; H04N 1/6097; H04N 1/646; H04N 2201/0039; H04N 2201/0041; H04N 2201/0049; H04N 2201/0055; H04N 2201/0094; H04N 9/643; G06F 3/1208; G06F 3/1229; G06F 3/1247; G06F 3/1256; G06F 3/1288
USPC ...... 358/3.26, 1.15, 1.9, 3.23, 504, 518, 530
See application file for complete search history.

(56) References Cited

U.S. PATENT DOCUMENTS

| | | | | |
|---|---|---|---|---|
| 7,092,119 | B1 * | 8/2006 | Hinds | H04N 1/6033 358/1.11 |
| 7,697,166 | B2 * | 4/2010 | Bray | H04N 1/6033 347/19 |
| 8,035,863 | B2 * | 10/2011 | Bisset | H04N 1/00002 358/406 |
| 9,001,377 | B2 * | 4/2015 | Kato | H04N 1/6044 358/1.15 |
| 9,533,513 | B1 * | 1/2017 | Qian | |
| 9,756,223 | B2 * | 9/2017 | Soriano | G06F 3/1217 |
| 9,876,943 | B2 * | 1/2018 | Lin | H04N 1/603 |
| 2005/0093923 | A1 * | 5/2005 | Busch | H04N 1/6033 347/43 |
| 2010/0315685 | A1 * | 12/2010 | Zaima | G06K 15/027 358/3.26 |
| 2012/0236331 | A1 * | 9/2012 | Taig | H04N 1/506 358/1.9 |
| 2014/0079444 | A1 | 3/2014 | Akamatsu | |
| 2014/0113528 | A1 * | 4/2014 | Cormont | B24B 13/00 451/6 |
| 2014/0160498 | A1 * | 6/2014 | Yano | G06F 3/1208 358/1.9 |
| 2015/0220819 | A1 * | 8/2015 | Yamamoto | G06K 15/027 358/1.9 |
| 2016/0052318 | A1 * | 2/2016 | Humet Pous | H04N 1/6036 347/19 |

* cited by examiner

FIG. 9A

| No. | DATE | ENGINE CALIBRATION DATA | | | | ENGINE INFORMATION | CONTROLLER CALIBRATION DATA | | | | OTHER INFORMATION |
|---|---|---|---|---|---|---|---|---|---|---|---|
| | | Cyan | Magenta | Yellow | Black | | Cyan | Magenta | Yellow | Black | |
| 1 | 2016/7/7 10:00AM | | | | | SHEET TYPE: PLAIN PAPER ROOM TEMPERATURE: 25°C | 0, 1, 2, 4, 9, ... 254, 255 | 0, 1, 3, 4, 9, ... 254, 255 | 0, 1, 2, 4, 10, ... 254, 255 | 0, 1, 2, 4, 9, ... 250, 255 | |
| 2 | 2016/7/7 6:00PM | | | | | SHEET TYPE: HEAVY PAPER 1 ROOM TEMPERATURE: 25°C | 0, 1, 3, 4, 9, ... 254, 255 | 0, 1, 2, 4, 9, ... 250, 255 | 0, 1, 2, 4, 9, ... 254, 255 | 0, 1, 2, 4, 10, ... 254, 255 | |
| 3 | 2016/7/8 9:00AM | | | | | SHEET TYPE: COATED PAPER ROOM TEMPERATURE: 24°C | 0, 1, 2, 4, 10, ... 254, 255 | 0, 1, 2, 4, 9, ... 254, 255 | 0, 1, 2, 4, 10, ... 254, 254 | 0, 1, 3, 4, 9, ... 254, 255 | |
| 4 | 2016/7/8 5:00PM | | | | | SHEET TYPE: COLORED PAPER ROOM TEMPERATURE: 25°C | 0, 1, 2, 4, 8, ... 250, 255 | 0, 1, 2, 4, 9, ... 254, 255 | 0, 1, 4, 5, 9, ... 254, 255 | 0, 1, 2, 4, 8, ... 254, 255 | |
| 5 | 2016/7/9 10:00AM | | | | | SHEET TYPE: PLAIN PAPER ROOM TEMPERATURE: 25°C | 0, 1, 2, 4, 8, ... 250, 255 | 0, 1, 2, 4, 9, ... 250, 255 | 0, 1, 3, 4, 9, ... 254, 255 | 0, 1, 2, 4, 9, ... 254, 255 | |

FIG. 9B

| No. | DATE | ENGINE CALIBRATION DATA | | | | ENGINE INFORMATION | CONTROLLER CALIBRATION DATA | | | | OTHER INFORMATION |
|---|---|---|---|---|---|---|---|---|---|---|---|
| | | Cyan | Magenta | Yellow | Black | | Cyan | Magenta | Yellow | Black | |
| 6 | 2016/7/10 10:00AM | | | | | SHEET TYPE: PLAIN PAPER ROOM TEMPERATURE: 25°C | 0, 1, 2, 4, 9, ... 254, 255 | 0, 1, 2, 4, 9, ... 250, 255 | 0, 1, 4, 5, 9, ... 254, 255 | 0, 1, 2, 4, 9, ... 254, 255 | |

FIG. 10A

| No. | DEVICE | ENGINE CALIBRATION DATA | | | | ENGINE INFORMATION | CONTROLLER CALIBRATION DATA | | | | OTHER INFORMATION |
|---|---|---|---|---|---|---|---|---|---|---|---|
| | | Cyan | Magenta | Yellow | Black | | Cyan | Magenta | Yellow | Black | |
| 1 | MFP1 | ↘ | ↘ | ↘ | ↘ | SHEET TYPE: PLAIN PAPER ROOM TEMPERATURE: 25°C | 0, 1, 2, 4, 9, ... 254, 255 | 0, 1, 3, 4, 9, ... 254, 255 | 0, 1, 2, 4, 10, ... 254, 255 | 0, 1, 2, 4, 9, ... 250, 255 | |
| 2 | MFP2 | ↘ | ↘ | ↘ | ↘ | SHEET TYPE: HEAVY PAPER 1 ROOM TEMPERATURE: 25°C | 0, 1, 3, 4, 9, ... 254, 255 | 0, 1, 2, 4, 9, ... 250, 255 | 0, 1, 2, 4, 9, ... 254, 255 | 0, 1, 2, 4, 10, ... 254, 255 | |
| 3 | MFP3 | ↘ | ↘ | ↘ | ↘ | SHEET TYPE: COATED PAPER ROOM TEMPERATURE: 24°C | 0, 1, 2, 4, 10, ... 254, 255 | 0, 1, 2, 4, 9, ... 254, 255 | 0, 1, 2, 4, 9, ... 254, 254 | 0, 1, 3, 4, 9, ... 254, 255 | |
| 4 | MFP4 | ↘ | ↘ | ↘ | ↘ | SHEET TYPE: COLORED PAPER ROOM TEMPERATURE: 25°C | 0, 1, 2, 4, 8, ... 250, 255 | 0, 1, 2, 4, 9, ... 254, 255 | 0, 1, 4, 5, 9, ... 254, 255 | 0, 1, 2, 4, 8, ... 254, 255 | |
| 5 | MFP5 | ↘ | ↘ | ↘ | ↘ | SHEET TYPE: PLAIN PAPER ROOM TEMPERATURE: 25°C | 0, 1, 2, 4, 8, ... 250, 255 | 0, 1, 2, 4, 9, ... 250, 255 | 0, 1, 3, 4, 9, ... 254, 255 | 0, 1, 2, 4, 9, ... 254, 255 | |

FIG. 10B

| No. | DEVICE | ENGINE CALIBRATION DATA | | | | ENGINE INFORMATION | CONTROLLER CALIBRATION DATA | | | | OTHER INFORMATION |
|---|---|---|---|---|---|---|---|---|---|---|---|
| | | Cyan | Magenta | Yellow | Black | | Cyan | Magenta | Yellow | Black | |
| 6 | MFP6 | | | | | SHEET TYPE: PLAIN PAPER ROOM TEMPERATURE: 25°C | 0, 1, 2, 4, 9, … 254, 255 | 0, 1, 2, 4, 9, … 250, 255 | 0, 1, 4, 5, 9, … 254, 255 | 0, 1, 2, 4, 9, … 254, 255 | |

FIG. 11A

| No. | DEVICE/DATE | ENGINE CALIBRATION DATA | | | | ENGINE INFORMATION | CONTROLLER CALIBRATION DATA | | | | OTHER INFORMATION |
|---|---|---|---|---|---|---|---|---|---|---|---|
| | | Cyan | Magenta | Yellow | Black | | Cyan | Magenta | Yellow | Black | |
| 1 | MFP1 2016/7/7 10:00AM | | | | | SHEET TYPE: PLAIN PAPER ROOM TEMPERATURE: 25°C | 0, 1, 2, 4, 9, ... 254, 255 | 0, 1, 3, 4, 9, ... 254, 255 | 0, 1, 2, 4, 10, ... 254, 255 | 0, 1, 2, 4, 9, ... 250, 255 | |
| 2 | MFP2 2016/7/7 6:00PM | | | | | SHEET TYPE: HEAVY PAPER 1 ROOM TEMPERATURE: 25°C | 0, 1, 3, 4, 9, ... 254, 255 | 0, 1, 2, 4, 9, ... 250, 255 | 0, 1, 2, 4, 9, ... 254, 255 | 0, 1, 2, 4, 10, ... 254, 255 | |
| 3 | MFP1 2016/7/8 9:00AM | | | | | SHEET TYPE: COATED PAPER ROOM TEMPERATURE: 24°C | 0, 1, 2, 4, 10, ... 254, 255 | 0, 1, 2, 4, 9, ... 254, 255 | 0, 1, 2, 4, 10, ... 254, 254 | 0, 1, 3, 4, 9, ... 254, 255 | |
| 4 | MFP2 2016/7/8 5:00PM | | | | | SHEET TYPE: COLORED PAPER ROOM TEMPERATURE: 25°C | 0, 1, 2, 4, 8, ... 250, 255 | 0, 1, 2, 4, 9, ... 254, 255 | 0, 1, 4, 5, 9, ... 254, 255 | 0, 1, 2, 4, 8, ... 254, 255 | |
| 5 | MFP3 2016/7/9 10:00AM | | | | | SHEET TYPE: PLAIN PAPER ROOM TEMPERATURE: 25°C | 0, 1, 2, 4, 8, ... 250, 255 | 0, 1, 2, 4, 9, ... 250, 255 | 0, 1, 3, 4, 9, ... 254, 255 | 0, 1, 2, 4, 9, ... 254, 255 | |

FIG. 11B

| No. | DEVICE/DATE | ENGINE CALIBRATION DATA | | | | ENGINE INFORMATION | CONTROLLER CALIBRATION DATA | | | | OTHER INFORMATION |
|---|---|---|---|---|---|---|---|---|---|---|---|
| | | Cyan | Magenta | Yellow | Black | | Cyan | Magenta | Yellow | Black | |
| 6 | MFP4 2016/7/10 10:00AM | | | | | SHEET TYPE: PLAIN PAPER ROOM TEMPERATURE: 25°C | 0, 1, 2, 4, 9, ... 254, 255 | 0, 1, 2, 4, 9, ... 250, 255 | 0, 1, 4, 5, 9, ... 254, 255 | 0, 1, 2, 4, 9, ... 254, 255 | |

…

CONTROLLER, CALIBRATION CONTROL PROGRAM, AND CALIBRATION CONTROL METHOD

The entire disclosure of Japanese patent Application No. 2016-250406, filed on Dec. 26, 2016, is incorporated herein by reference in its entirety.

BACKGROUND

Technological Field

The present invention relates to controllers, calibration control programs, and calibration control methods, and more particularly, to a controller that controls an image forming device that performs calibration, a calibration control program to be executed by the controller, and a calibration control method to be implemented in a printing system that includes the image forming device and the controller.

Description of the Related Art

In a copying machine or multi-functional peripherals (MFP) having a color print function, or more particularly, in an image forming device such as a product printing (PP) machine, the colors in printed materials change over time. Therefore, calibration is performed to adjust printed image quality. This calibration is automatically performed after printing has been performed on a certain number of paper sheets, or is forcibly performed by an operator. In many cases, calibration is performed at least once a day, or is performed every morning when the machine is activated, for example.

The above calibration is known by various names, such as color output stabilization, tone correction, and density adjustment, and can be performed in various manners. Examples of calibration methods include: a method of adjusting image quality by applying toner onto a photosensitive member or a transfer belt, and measuring the density of the toner, without any printing performed on a paper sheet; and a method of adjusting image quality by printing a measurement page having a measurement pattern formed thereon, scanning and measuring the measurement page with a density meter and a scanner provided in the image forming device, and comparing a set output value with the measured actual output value. By the former method, image quality can be adjusted, without any printing performed on a paper sheet. Thus, paper sheets are not unnecessarily consumed. However, the image quality adjustment cannot reflect sheet types, fixing conditions, and the like. By the latter method, paper sheets are consumed, but image adjustment is performed on each completed printed material. Thus, image quality can be accurately adjusted.

There are different kinds of calibration: calibration designed mainly to adjust an output value to a value close to a design target by adjusting the voltage to be used for charging the development device in the image forming device or for transfer (this kind of calibration will be hereinafter referred to as engine calibration); and calibration designed mainly to adjust the design target to the customer's liking by increasing or decreasing the numerical value to be output as data (this kind of calibration will be hereinafter referred to as controller calibration).

As for a technology to control such calibration, JP 10-063047 A discloses a control device that controls an image forming unit having a calibration function for correcting image quality variation in output images, for example. The control device includes: a detecting unit that detects a state change that requires calibration; and an output unit that outputs calibration information for prompting calibration when the detecting unit detects the state change.

Also, JP 03814342 B1 discloses an image processing device connected to external devices via a network. The image processing device includes: a detecting unit that detects a change in the state of an image forming unit; an inquiring unit that sends an inquiry to an external device when a change in the state of the image forming unit is detected, the inquiry being as to whether calibration is to be performed, the external device having issued the instruction as to the image output job currently being executed; a noticing unit that issues a calibration notice to the external devices other than the external device that has issued the instruction as to the image output job currently being executed; an input unit to which an instruction from the external device that has received the inquiry is input; and a control unit that controls the calibration timing in accordance with the instruction.

As for a technology to save time and image formation materials, though not a technology related to calibration, JP 2014-059490 A discloses an image forming device that includes a temperature detecting unit that measures the temperature of an appropriate portion in the image forming device, and, from the measured temperature, generates information indicating the image formation environment of an engine unit that might affect the position of image formation performed by an image forming unit, for example. In a case where the temperature variation during the time from the execution of the latest correction till the present time is determined to be within a predetermined range with respect to each of the colors other than a reference color, the image forming device determines that positioning correction for the current printing is unnecessary.

In many high-performance image forming devices, one of controllers developed and manufactured by different manufacturers is selected as a controller that rasterizes each print job output from a client device. The selected controller has a unique measurement pattern for controller calibration, taking advantage of its own features. This measurement pattern differs from the measurement pattern for engine calibration (differs in the amount of density change in each patch, for example).

Therefore, a user needs to conduct both engine calibration and controller calibration, and measurement patterns suitable for the respective kinds of calibration need to be formed and measured. As a result, the user needs to take a lot of trouble, and a larger amount of paper is consumed in printing the measurement patterns. Particularly, in the case of a color image forming device, toners of the four colors C, M, Y, and K are required, and measurement patterns need to be formed for the respective colors in some cases. Therefore, a user needs to take greater trouble, and the consumption of paper in printing the measurement patterns becomes even larger.

Even if the techniques disclosed in JP 10-063047 A, JP 03814342 B 1, and JP 2014-059490 A are used to control calibration in solving the above problem, both engine calibration and controller calibration still need to be performed. Therefore, the above problem is not solved.

SUMMARY

The present invention has been made in view of the above problem, and a primary object thereof is to provide a controller, a calibration control program, and a calibration control method that can save the trouble of performing calibration and reduce consumption of paper by effectively using the results of calibration performed in the past.

To achieve the abovementioned object, according to an aspect of the present invention, there is provided a controller in a printing system that includes the controller equipped with an image processor that generates image data for printing by rasterizing a print job, and an image forming device equipped with an engine that performs a printing process in accordance with the image data for printing, the controller and the image forming device each performing calibration to adjust an output of the image forming device, and the controller reflecting one aspect of the present invention comprises a hardware processor that: associates first calibration data indicating a result of first calibration performed by the image forming device with second calibration data indicating a result of second calibration performed by the controller in accordance with the first calibration, and stores the first calibration data and the second calibration data into a storage; when obtaining the first calibration data of the first calibration performed by the image forming device, compares the obtained first calibration data with the stored first calibration data, and determines whether the stored first calibration data includes data equal to the obtained first calibration data; and, when there is no data equal to the obtained first calibration data, creates the second calibration data to be associated with the obtained first calibration data by performing the second calibration, and, when there is data equal to the obtained first calibration data, creates the second calibration data to be associated with the obtained first calibration data, using the second calibration data stored and associated with the equal data.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 9A and 9B are examples of tables that associate engine calibration data with controller calibration data according to an embodiment of the present invention;

FIGS. 10A and 10B are other examples of tables that associate engine calibration data with controller calibration data according to an embodiment of the present invention; and FIGS. 11A and 11B are other examples of tables that associate engine calibration data with controller calibration data according to an embodiment of the present invention.

DETAILED DESCRIPTION OF EMBODIMENTS

Figure 1:
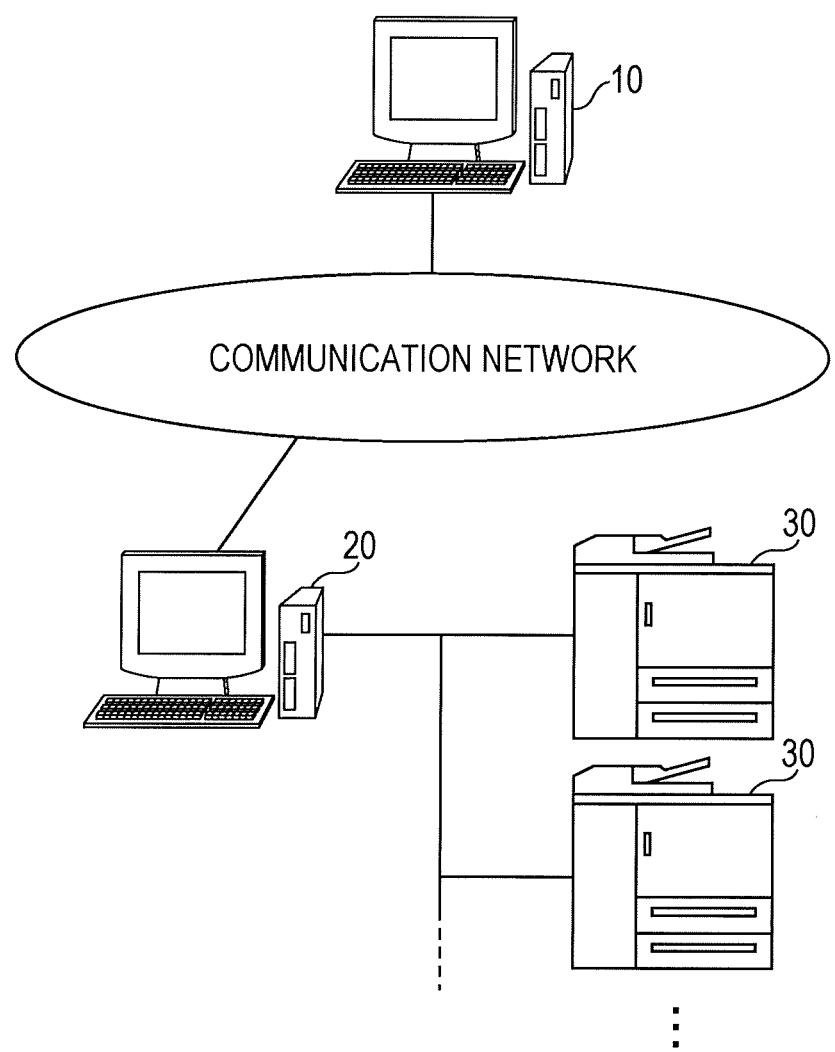
FIG. 1 is a schematic diagram showing an example of a printing system according to an embodiment of the present invention.

Hereinafter, one or more embodiments of the present invention will be described with reference to the drawings. However, the scope of the invention is not limited to the disclosed embodiments.

As described above as the related art, in a printing system that includes an image forming device and a controller, calibration is performed on a regular basis. The calibration includes engine calibration for adjusting an output value to a value close to a design target by controlling the voltage being used for charging the development device or transfer in the image forming device, and controller calibration for adjusting the design target to the customer's liking by increasing or decreasing the numerical value to be output as data.

Engine calibration operations and controller calibration operations are preferably performed in pairs. However, a measurement pattern for controller calibration differs from a measurement pattern for engine calibration. Therefore, a user needs to conduct calibration on both the image forming device and the controller, and, in some cases, might need to form a measurement pattern for each of the four colors C, M, Y, and K. As a result, the trouble the user has to take becomes greater, and the consumption of paper in printing measurement patterns becomes larger.

Therefore, in an embodiment of the present invention, a controller associates engine calibration data indicating a result of engine calibration performed by an image forming device with controller calibration data indicating a result of controller calibration performed by the controller, and stores the engine calibration data and the controller calibration data associated with each other. Effectively using the controller calibration data stored in the past, the controller can skip printing and measuring of the measurement pattern for performing controller calibration.

Specifically, in a printing system that includes a controller equipped with an image processor that generates image data for printing by receiving a print job from a client device and rasterizing the print job, and an image forming device equipped with an engine that performs a printing process in accordance with the image data for printing, and causes each of the controller and the image forming device to perform calibration, the controller associates engine calibration data indicating a result of engine calibration performed by the image forming device with controller calibration data indicating a result of controller calibration performed by the controller in accordance with the engine calibration, and stores the engine calibration data and the controller calibration data associated with each other. When obtaining the engine calibration data from the image forming device, the controller compares the obtained engine calibration data with the stored engine calibration data.

In a case where the stored engine calibration data does not include data equal to the obtained engine calibration data (for example, where an output density difference in a predetermined input density range in the engine input-output characteristics indicated by the engine calibration data is larger than a predetermined threshold value, where density changes in the input-output characteristics do not have the same tendencies, a difference between the slopes of the graphs indicating the density changes is larger than a predetermined threshold value, a correlation coefficient between the output densities of both sets of engine calibration data is smaller than a predetermined threshold value, or where engine information indicating the sheet type and the room temperature at the time of the engine calibration is not the same), the controller performs controller calibration, to create the controller calibration data to be associated with the obtained engine calibration data. In a case where there is data equal to the obtained engine calibration data, the controller creates the controller calibration data to be associated with the obtained engine calibration data, using the controller calibration data stored and associated with the equal engine calibration data.

In an environment where image forming devices are connected to a single controller, engine calibration data of each of the respective image forming device is associated with controller calibration data, and is stored. When obtaining the engine calibration data from a predetermined image forming device, the controller compares the engine calibration data obtained from the predetermined image forming device with the stored engine calibration data of another one of the image forming devices. If the stored engine calibration data includes data equal to the obtained engine calibration data, the controller creates the controller calibration data to be associated with the engine calibration data of the predetermined image forming device, using the controller calibration data stored and associated with the equal engine calibration data.

In this manner, it is possible to obtain appropriate controller calibration data by effectively using the results of calibration performed in the past, without printing and measuring a measurement pattern for performing controller calibration. Thus, the trouble each user has to take can be saved, and consumption of paper in printing measurement patterns can be reduced, while the printing system maintains high printed image quality.

[Embodiment]

Figure 2:
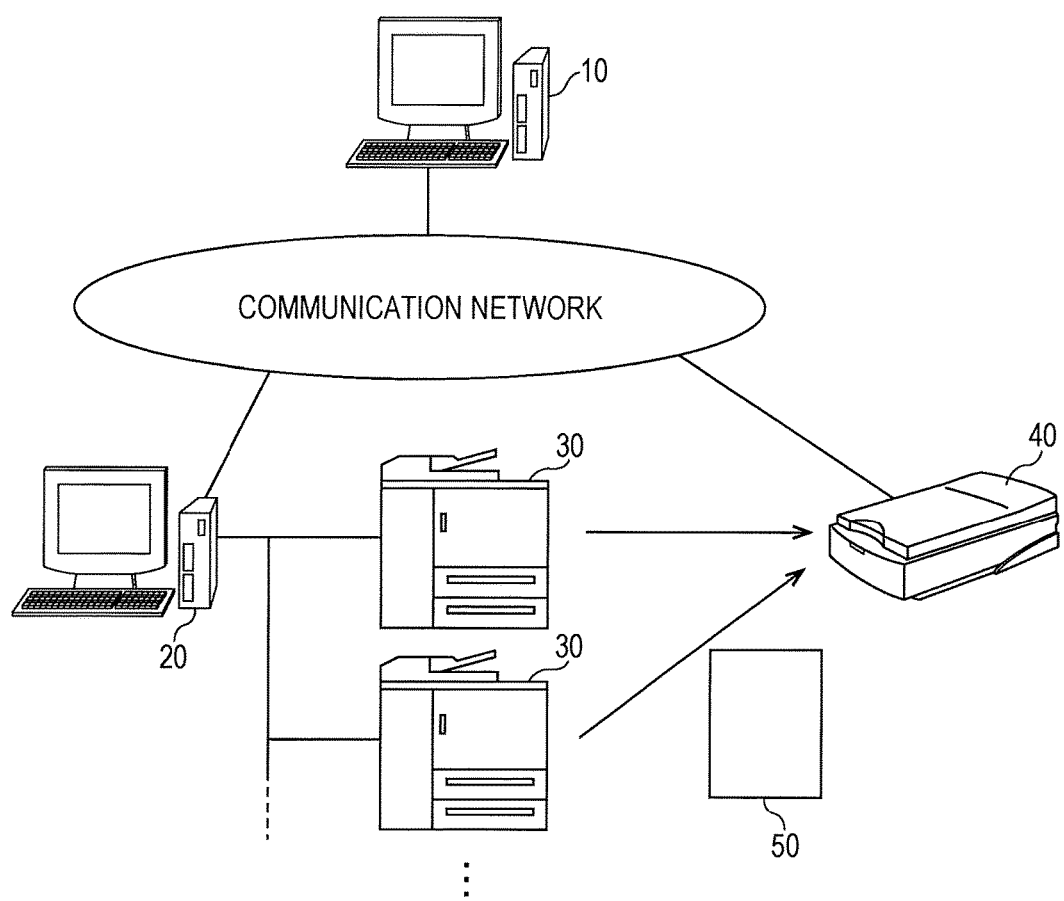
FIG. 2 is a schematic diagram showing another example of a printing system according to an embodiment of the present invention.
Figure 3:
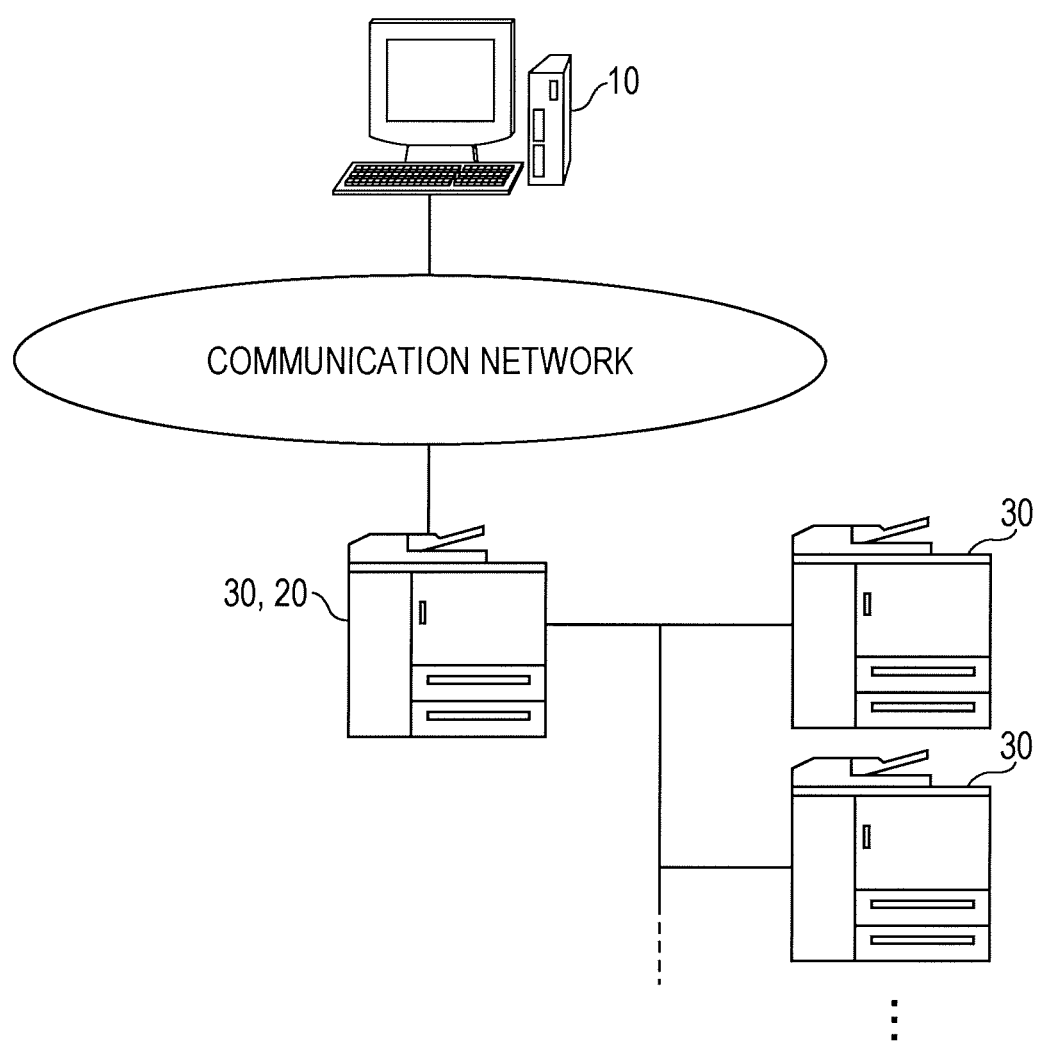
FIG. 3 is a schematic diagram showing yet another example of a printing system according to an embodiment of the present invention.
Figure 5A:
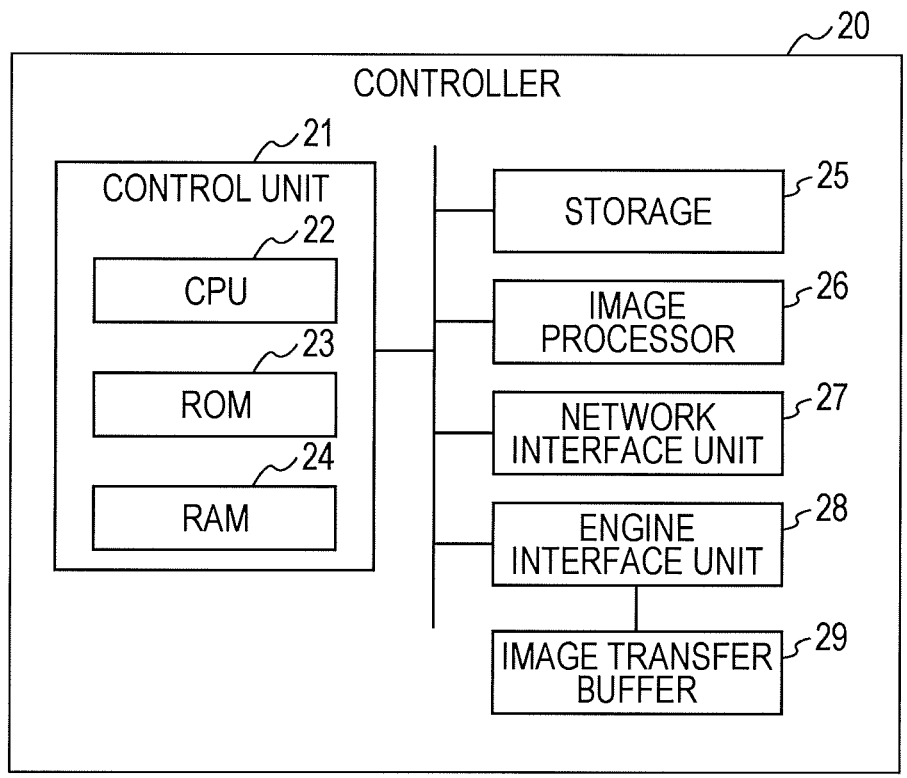
FIGS. 5A and 5B are block diagrams showing the configuration of a controller according to an embodiment of the present invention.
Figure 5B:
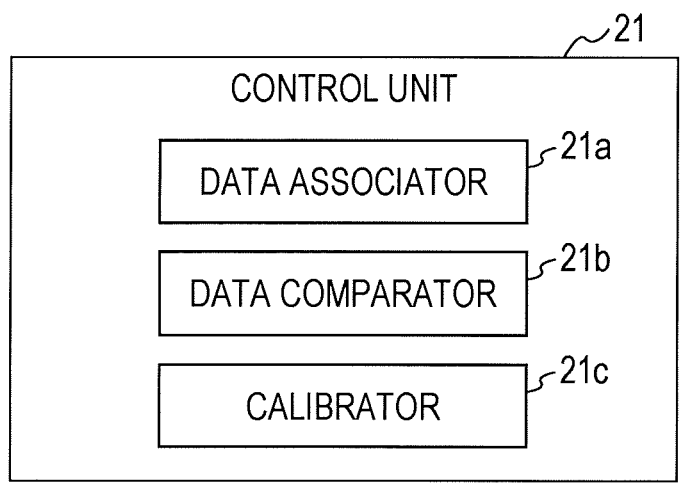
Figure 6A:
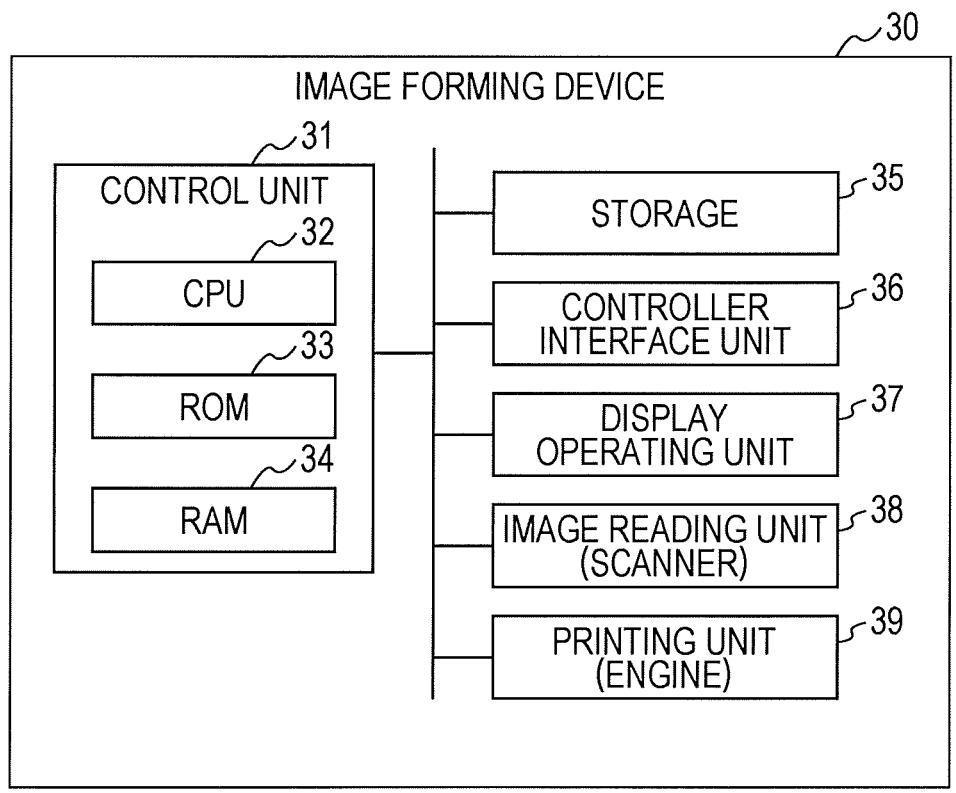
FIGS. 6A and 6B are block diagrams showing the configuration of an image forming device according to an embodiment of the present invention.
Figure 6B:
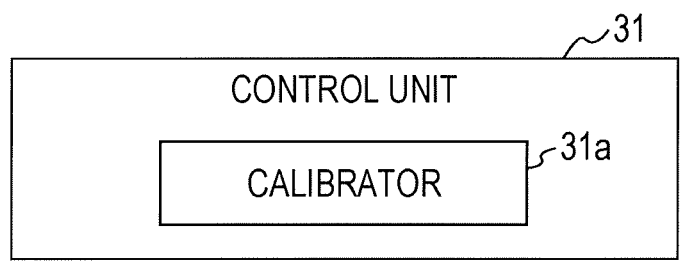
Figure 7:
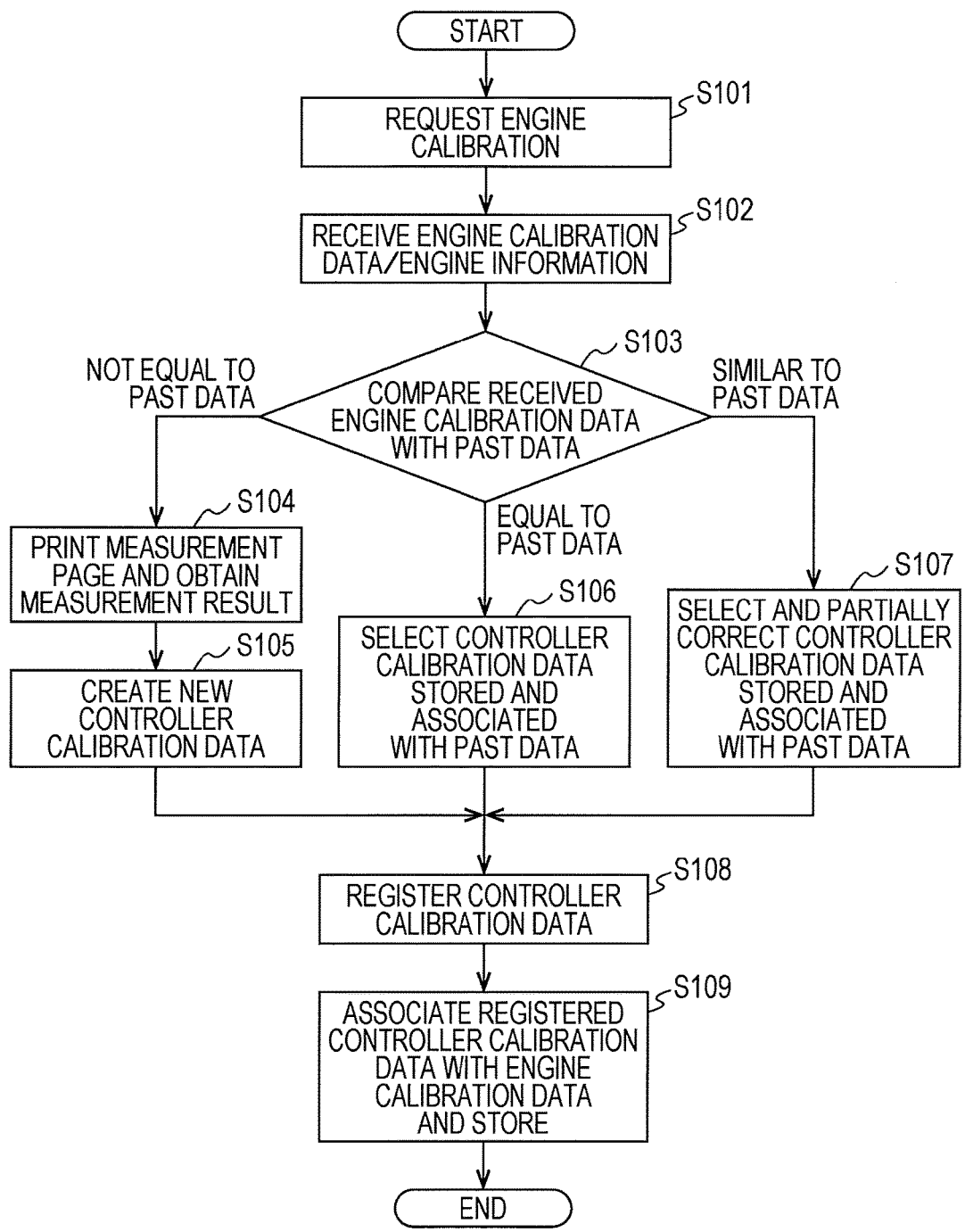
FIG. 7 is a flowchart showing an operation to be performed by the controller according to an embodiment of the present invention.
Figure 8:
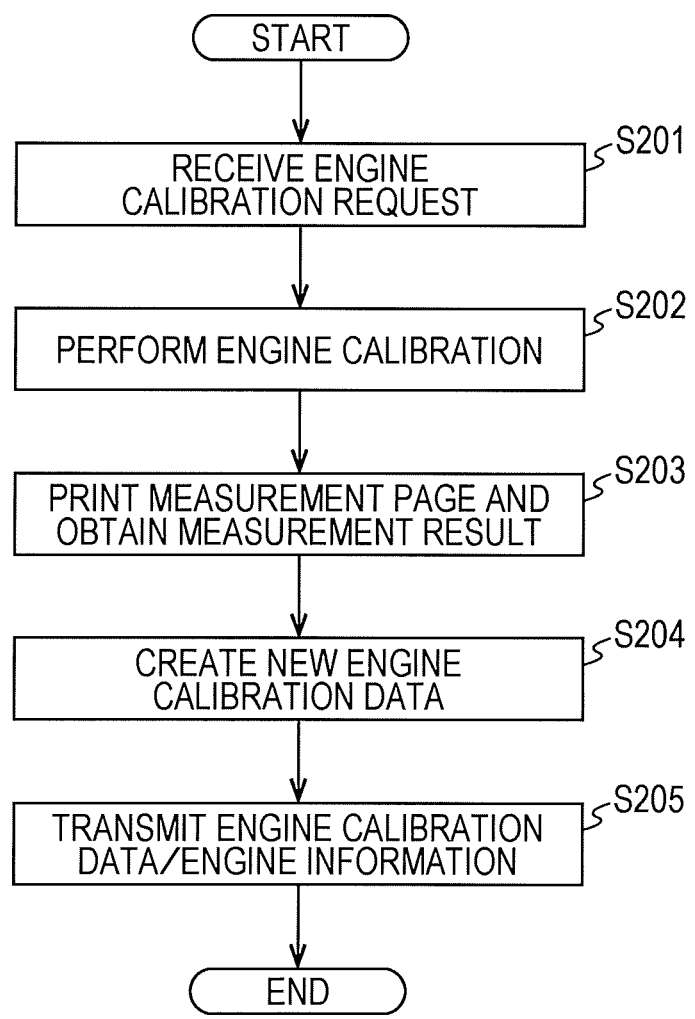
FIG. 8 is a flowchart showing an operation to be performed by an image forming device according to an embodiment of the present invention.

To explain the above described embodiment of the present invention in greater detail, a controller, a calibration control program, and a calibration control method according to an embodiment of the present invention are described, with reference to FIGS. 1 through 11B. FIGS. 1 through 3 are diagrams each schematically showing an example of a printing system of this embodiment. FIGS. 4A and 4B, FIGS. 5A and 5B, and FIGS. 6A and 6B are block diagrams showing the configurations of a client device, a controller, and an image forming device, respectively. FIG. 7 is a flowchart showing an operation to be performed by the controller of this embodiment. FIG. 8 is a flowchart showing an operation to be performed by an image forming device of this embodiment. FIGS. 9A and 9B, FIGS. 10A and 10B, and FIGS. 11A and 11B are examples of tables each associating engine calibration data with controller calibration data.

As shown in FIG. 1, the printing system of this embodiment is formed with a client device 10, a controller 20, an image forming device 30, and the like, which are connected via a communication network. The interfaces of the communication network may be network interfaces compliant with Ethernet (registered trademark), Token Ring, FDDI (Fiber-Distributed Data Interface), or the like, serial interfaces compliant with USB (Universal Serial Bus), IEEE 1394, or the like, parallel interfaces compliant with SCSI (Small Computer System Interface), IEEE 1284, or the like, wireless communication interfaces compliant with Bluetooth (registered trademark), IEEE 802.11, Home RF (Radio Frequency), IrDA (Infrared Data Association), or the like. The controller 20 and the image forming device 30 may be connected by a special line for PCI (Peripheral Component Interconnect) connection or the like.

It should be noted that the types and the numbers of the machines to be connected by the communication network are not limited to the example shown in FIG. 1. Also, in this embodiment, an image reading unit (scanner) is included in the image forming device 30. However, as shown in FIG. 2, a scanner 40 may be provided separately from the image forming device 30, a measurement page 50 output from the image forming device 30 may be measured with the scanner 40, and the measured value (output density) may be transmitted to the controller 20 and the image forming device 30. Also, in FIGS. 1 and 2, the controller 20 and the image forming device 30 are independent of each other. However, as shown in FIG. 3, the controller 20 may be included in the image forming device 30 (the image forming device 30 also has the functions of the controller 20). In the description below, the configurations of the respective devices are explained in detail on the basis of the printing system shown in FIG. 1.

[Client Device]

Figure 4A:
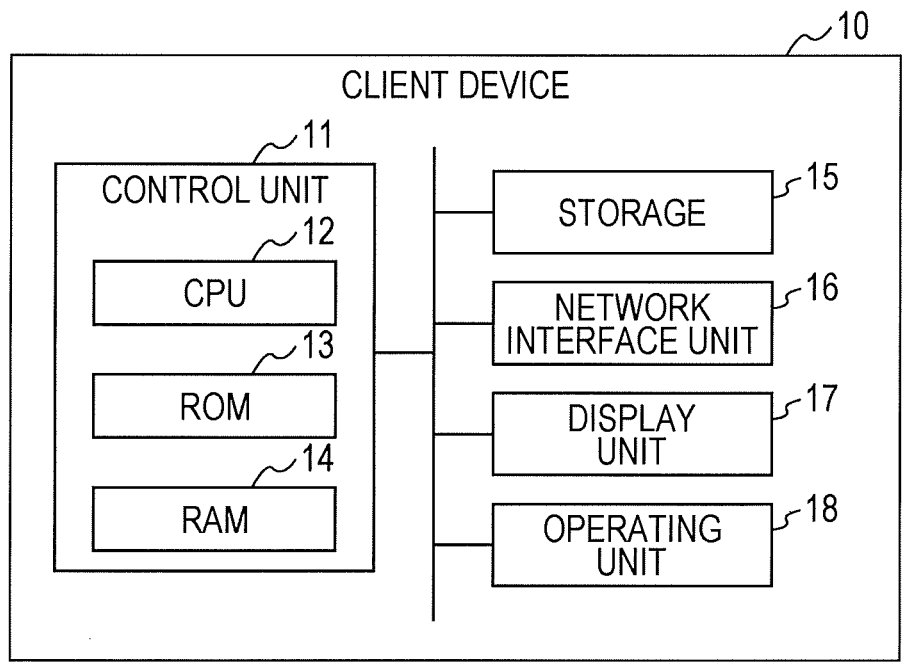
FIGS. 4A and 4B are block diagrams showing the configuration of a client device according to an embodiment of the present invention.

The client device 10 is a computing device such as a personal computer, a mobile terminal such as a smartphone or a tablet, or the like, and includes a control unit 11, a storage 15, a network interface unit 16, a display unit 17, and an operating unit 18, as shown in FIG. 4A.

The control unit 11 includes a CPU (Central Processing Unit) 12 and memories such as a ROM (Read Only Memory) 13 and a RAM (Random Access Memory) 14, and these components are connected via a bus. The ROM 13 stores programs and the like. The RAM 14 stores the data required by the CPU 12 performing control, the data required to be temporarily stored during a control operation, and the like. The CPU 12 loads a control program stored in the ROM 13 or the storage 15 into the RAM 14, and executes the control program, to control operation of the entire client device 10.

Figure 4B:
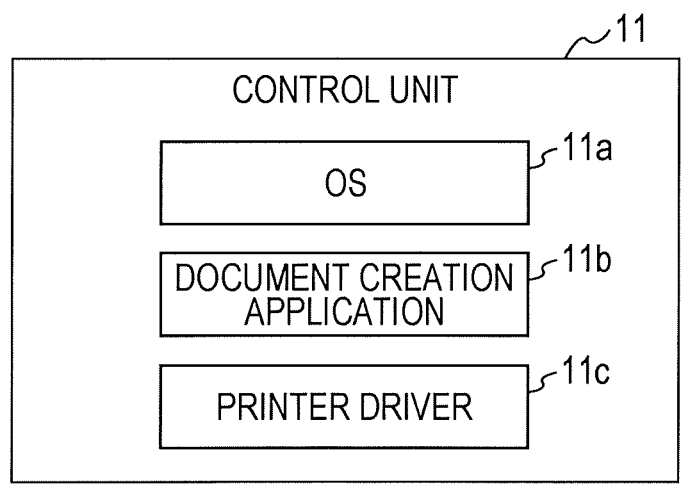

As shown in FIG. 4B, the control unit 11 operates or executes an OS (Operating System) 11a, a document creation application 11b, a printer driver 11c, and the like.

The OS 11a is Windows (registered trademark), Mac OS (registered trademark), Android (registered trademark), or the like, and enables operation or execution of the document creation application 11b and the printer driver 11c in the client device 10.

The document creation application 11b is software for document creation, table calculation, image processing, and the like. When a printing instruction is issued, the printer driver 11c is read, and document data created by the document creation application 11b is transferred to the printer driver 11c.

The printer driver 11c converts the document data created by the document creation application 11b, into a print job in a language that can be interpreted by the controller 20 (the print job being PDL (Page Description Language) data written in a page description language such as PJL (Printer Job Language), PS (PostScript), XPS (XML Paper Specification), or PCL (Printer Control Language), or PDF (Portable Document Format) data). Print setting information that is set through the print setting screen of the printer driver 11c is attached to this print job.

The storage 15 is formed with an HDD (Hard Disk Drive) or an SSD (Solid State Drive), and stores the program for the CPU 12 to control the respective components, document data, a print job, print setting information from the printer driver 11c, information about the processing functions of the device, and the like.

The network interface unit 16 is formed with an NIC (Network Interface Card), a modem, or the like. The network interface unit 16 establishes a connection to the controller 20 via the communication network, and then transmits a print job to the controller 20 or receives device information about the image forming device 30 from the controller 20.

The display unit 17 is formed with an LCD (Liquid Crystal Display), an organic EL (electroluminescence) display, or the like, and displays the document creation screen of the document creation application 11b, the print setting screen of the printer driver 11c, or the like. The operating unit 18 is formed with a keyboard, a mouse, a touch sensor formed on the display unit 17, or the like, and enables various operations such as document creation and print setting.

[Controller]

The controller 20 is a computing device, a server device, or the like, and instructs the image forming device 30 to perform printing and engine calibration. In a case where two or more image forming devices 30 are connected to the communication network, the image forming devices 30 are set and managed as a group of image forming devices 30 in advance, and one or more image forming devices 30 selected from the group are instructed to perform printing and engine calibration. As shown in FIG. 5A, the controller 20 includes a control unit 21, a storage 25, an image processor 26, a network interface unit 27, and an engine interface unit 28, and, if necessary, also includes a display unit and an operating unit.

The control unit 21 includes a CPU 22 and memories such as a ROM 23 and a RAM 24, and these components are connected via a bus. The ROM 23 stores programs and the like. The RAM 24 stores the data required by the CPU 22 performing control, the data required to be temporarily stored during a control operation, and the like. The CPU 22 loads a program stored in the ROM 23 or the storage 25 into the RAM 24, and executes the program, to control operation of the entire controller 20. Alternatively, the CPU 22 may be formed with a multi-core CPU so that the CPU 22 can simultaneously perform more than one process.

As shown in FIG. 5B, the control unit 21 functions as a data associator 21a, a data comparator 21b, a calibrator 21c, and the like.

The data associator 21a obtains engine calibration data from the image forming device 30, and obtains controller calibration data obtained by the calibrator 21c performing controller calibration in accordance with the engine calibration. The data associator 21a associates the engine calibration data with the controller calibration data, and stores the data into the storage 25 or the like.

When obtaining engine calibration data from the image forming device 30, the data comparator 21b compares the obtained engine calibration data with the engine calibration data stored in the storage 25 or the like, and determines whether the stored engine calibration data includes data equal to the obtained engine calibration data. Whether engine calibration data is equal to some other engine calibration data can be determined on the basis of whether the difference in output density in a predetermined input density range (input densities of 50% and 100%, for example) in the engine input-output characteristics indicated by the engine calibration data is equal to or smaller than a predetermined threshold value, whether the density changes in the density input-output characteristics have the same tendencies (or whether the shapes of the density change graphs are of the same type, such as linear shapes, quadratic curves, or logarithmic curves), whether the difference between the gradients of the density change graphs (coefficients calculated through a regression analysis or the like) is equal to or smaller than a predetermined threshold value, whether the correlation coefficient indicating the relationship between the output densities of both sets of the engine calibration data is equal to or greater than a predetermined threshold value, whether the paper sheets used at the time of the engine calibration are of the same type, or whether the difference in room temperature at the time of the engine calibration is smaller than a predetermined threshold value, for example.

In a case where the stored engine calibration data does not include data equal to the engine calibration data obtained from the image forming device 30, the calibrator 21c performs controller calibration, to create controller calibration data to be associated with the engine calibration data obtained from the image forming device 30. In a case where there is data equal to the engine calibration data obtained from the image forming device 30, on the other hand, the calibrator 21c creates controller calibration data to be associated with the engine calibration data obtained from the image forming device 30, using the stored controller calibration data associated with the equal data (so that the controller calibration data includes at least part of the stored controller calibration data associated with the equal data). The created controller calibration data is then reflected by (registered in) the data to be referred to when the image processor 26 performs rasterizing or image processing, and the data associator 21a is also notified of the created controller calibration data. When controller calibration is performed, the image forming device 30 is caused to print a measurement page on which a measurement pattern unique to the device is arranged, and the external scanner 40 or the image reading unit in the image forming device 30 is then caused to measure the density of the measurement pattern. Controller calibration data for converting an input density to an output density is then created so that the measured value becomes equal to the value of the target color space to the customer's liking.

The data associator 21a, the data comparator 21b, and the calibrator 21c may be formed as hardware. Alternatively, a calibration control program for causing the control unit 21 to function as the data associator 21a, the data comparator 21b, and the calibrator 21c may be created, and be executed by the CPU 22.

The storage 25 is formed with an HDD, an SSD, or the like, and stores a print job obtained from the client device 10, engine calibration data obtained from the image forming device 30, controller calibration data created by the calibrator 21c, a table that associates engine calibration data with controller calibration data, and the like.

The image processor 26 includes an RIP (Raster Image Processor). The image processor 26 generates image data of each page of a print job by rasterizing each page of a print job, and performs image processing (processing such as color adjustment, density adjustment, and size adjustment) and screening on the generated image data.

The network interface unit 27 is formed with an NIC, a modem, or the like. The network interface unit 27 establishes a connection to the client device 10 via the communication network, and receives a print job from the client device 10.

The engine interface unit 28 is formed with an NIC, a modem, or the like. The engine interface unit 28 establishes connections to the controller 20 and the image forming device 30, to transmit print image data to the image forming device 30 and receive engine calibration data from the image forming device 30. An image transfer buffer 29 is connected to the engine interface unit 28, and the image transfer buffer 29 temporarily stores image data to transfer an image to the image forming device 30.

[Image Forming Device]

The image forming device 30 is an MFP, a single-function printer, or the like. Image forming devices 30 included in the printing system can be managed as a group, and any of the image forming devices 30 belonging to the same group can be subjected to the calibration control of this embodiment. As shown in FIG. 6A, the image forming device 30 includes a control unit 31, a storage 35, a controller interface unit 36, a display operating unit 37, an image reading unit (scanner) 38, and a printing unit (engine) 39.

The control unit 31 includes a CPU 32 and memories such as a ROM 33 and a RAM 34, and these components are connected via a bus. The ROM 33 stores programs and the like. The RAM 34 stores the data required by the CPU 32 performing control, the data required to be temporarily stored during a control operation, and the like. The CPU 32 loads a program stored in the ROM 33 or the storage 35 into the RAM 34, and executes the program, to control operation of the entire image forming device 30.

As shown in FIG. 6B, the control unit 31 functions as a calibrator 31a and the like. In accordance with a request from the controller 20, the calibrator 31a performs engine calibration. Specifically, the printing unit 39 is caused to print a measurement page on which a measurement pattern unique to the device is arranged, and the image reading unit 38 or the external scanner 40 is caused to measure the density of the measurement pattern. Engine calibration data for converting an input density to an output density is then created so that the measured value approximates a design target. At this point of the processing, the type of the paper sheet on which the measurement page is printed is obtained from the printing unit 39, and temperature information (room temperature) is obtained from a temperature measuring means (thermometer) or the like placed at an appropriate location in the image forming device 30. The created engine calibration data is then reflected by (registered in) the data to be referred to when the printing unit 39 performs a printing process, and engine information such as the sheet type and the room temperature is added to the created engine calibration data to be output to the controller 20.

The storage 35 is formed with an HDD, an SSD, or the like, and stores print image data received from the controller 20, engine calibration data (including engine information) created by the calibrator 31a, and the like.

The controller interface unit 36 is formed with an NIC, a modem, or the like. The controller interface unit 36 establishes connections to the image forming device 30 and the controller 20, to receive print image data from the controller 20 and transmit engine calibration data to the controller 20.

The display operating unit 37 is a touch panel or the like that has an operating unit such as a touch sensor placed on a display unit such as an LCD. The display operating unit 37 displays a printing conditions setting screen, a calibration setting screen, or the like, to enable operations such as setting and selecting through the screen.

The image reading unit (scanner) 38 optically reads image data from an original document placed on a platen. The image reading unit 38 includes a light source that scans the original document, image sensors such as CCDs (Charge Coupled Devices) that convert light reflected from the original document into electrical signals, and an A/D converter that performs A/D conversion on the electrical signals.

The printing unit (engine) 39 performs color printing in accordance with the image data. The printing unit 39 performs the following process. Each photosensitive drum charged by a charging device is irradiated with light from an exposure device in accordance with the image, so that an electrostatic latent image is formed. The electrostatic latent image is developed by a development device applying charged toner to the photosensitive drum. The toner image is transferred onto a transfer belt by primary transfer, is transferred onto a paper sheet by secondary transfer, and is further fixed onto the paper sheet by a fixing device. The printing unit 39 also includes an in-line scanner in the vicinity of the photosensitive drums or the transfer belt, or in the sheet conveyance path, if necessary.

FIGS. 1 through 6B show an example of a printing system according to this embodiment, and the configuration thereof can be changed as appropriate. For example, FIGS. 5A and 5B show a configuration in which the control unit 21 of the controller 20 functions as the data associator 21a, the data comparator 21b, and the calibrator 21c. However, in a case where the controller 20 is included in the image forming device 30 as in the printing system shown in FIG. 3, the control unit 31 of the image forming device 30 may function as a data associator, a data comparator, and a calibrator (or the CPU 32 of the control unit 31 of the image forming device 30 may execute the calibration control program). The table that associates engine calibration data with controller calibration data is not necessarily stored in the storage 25 of the controller 20, but may be stored in a storage device such as a server connected to the communication network.

A specific operation to be performed by the controller 20 is now described. The CPU 22 loads the calibration control program stored in the ROM 23 or the storage 25 into the RAM 24, and executes the calibration control program, to carry out the processes in the respective steps shown in the flowcharts in FIG. 7. The operation described below is based on the assumption that the control unit 21 (the data associator 21a) of the controller 20 associates engine calibration data obtained from the image forming device 30 with controller calibration data created by the control unit 21 (the calibrator 21c), and stores the engine calibration data and the controller calibration data into the storage 25 or the like in advance.

First, the control unit 21 of the controller 20 issues an engine calibration request to the image forming device 30 via the engine interface unit 28 (S101), and receives engine calibration data (including the engine information obtained when engine calibration is performed) from the image forming device 30 via the engine interface unit 28 (S102). Here, the engine calibration data is not necessarily received via the engine interface unit 28, but may be obtained via a USB memory or the like.

The control unit 21 (the data comparator 21b) then compares the engine calibration data received from the image forming device 30 with past engine calibration data stored in the storage 25 or the like (this past engine calibration data will be hereinafter referred to as past data) (S103).

If it is determined, as a result of the comparison, that the received engine calibration data does not match the past data (there is no past data equal to the received engine calibration data with respect to any of the colors C, M, Y, and K), the control unit 21 (the calibrator 21c) causes the image forming device 30 to print a measurement page on which a measurement pattern for controller calibration is arranged for all the colors, and causes the image reading unit 38 of the image forming device 30 or the external scanner 40 to measure the measurement pattern, to obtain a measurement result (S104). By doing so, the control unit 21 (the calibrator 21c) creates new controller calibration data (S105). Although the measurement result is obtained through measurement page printing and measurement in this example, a measurement result may be obtained by causing the image forming device 30 to read toner on the photosensitive members or the transfer belt with an in-line scanner or the like, without printing any measurement page.

If the received engine calibration data matches the past data (there is past data equal to the received engine calibration data with respect to each of the colors C, M, Y, and K), on the other hand, the control unit 21 (the calibrator 21c) selects the controller calibration data stored and associated with the past data with respect to the respective colors, and creates controller calibration data (S106). The case where the received engine calibration data matches the past data will be described later in detail.

If the received engine calibration data is similar to the past data (there is past data equal to the received engine calibration data with respect to some of the colors, and there is past data similar to the received engine calibration data (the past data has the same input-output characteristics as the received engine calibration data and engine information similar to the received engine calibration data) with respect to the other colors), the control unit 21 (the calibrator 21c) selects the controller calibration data stored and associated with the past data with respect to the respective colors, and performs partial correction on the selected controller calibration data, to create controller calibration data (S107). Here, the partial correction is to correct the controller calibration data stored and associated with the past data that has the same input-output characteristics and similar engine information. The case where there is similar past data will also be described later in detail.

After that, the control unit 21 (the calibrator 21c) registers, in the controller 20, the new controller calibration data created in S105, the controller calibration data selected and created with respect to the respective colors in S106, or the controller calibration data selected and partially corrected with respect to the respective colors in S107 (S108). The control unit 21 (the data associator 21a) associates the registered controller calibration data with the engine calibration data received in S102, and stores the associated controller calibration data and engine calibration data into the storage 25 or the like (S109).

Referring now to the flowchart in FIG. 8, a specific operation to be performed by the image forming device 30 is described.

First, the control unit 31 of the image forming device 30 receives an engine calibration request from the controller 20 via the controller interface unit 36 (S201). The control unit 31 (the calibrator 31a) performs engine calibration (S202), causes the printing unit 39 to print a measurement page on which a measurement pattern for engine calibration is arranged, and causes the image reading unit 38 or the external scanner 40 to measure the measurement page, to obtain a measurement result (S203). By doing so, the control unit 31 (the calibrator 31a) creates new engine calibration data (S204). Although the measurement result is obtained through measurement page printing and measurement in this example, a measurement result may be obtained by reading toner applied onto the photosensitive members or the transfer belt with an in-line scanner or the like, without printing any measurement page.

The control unit 31 (the calibrator 31a) then transmits the engine calibration data to the controller 20 via the controller interface unit 36 (S205). In doing so, the control unit 31 (the calibrator 31a) adds the engine information such as the sheet type and the room temperature at the time of the engine calibration to the engine calibration data.

In S103 in the above described flowchart, there are three possible cases: a case where the received engine calibration data does not match the past data; a case where the received engine calibration data matches the past data; and a case where the received engine calibration data is similar to the past data. However, control to be performed in a case where the received engine calibration data is similar to the past data is not necessarily performed, but this control can widen the range of use of the past data.

Referring now to FIGS. 9A and 9B, the case where the received engine calibration data matches the past data in S103 in FIG. 7, and the case where the received engine calibration data is similar to the past data in S103 are described.

FIG. 9A is an example of a table that associates the engine calibration data stored in the past with the controller calibration data stored in the past. FIG. 9B is an example of a table that associates the engine calibration data obtained in the current operation with the controller calibration data to be applied in the current operation. It should be noted that engine calibration data in this embodiment includes "date", "engine calibration data", and "engine information" as shown in FIGS. 9A and 9B. The engine calibration data in FIGS. 9A and 9B indicates density input-output characteristics (gamma characteristics), the abscissa axis indicating input density, the ordinate axis indicating output density. The controller calibration data in FIGS. 9A and 9B indicates the values of the output densities corresponding to the respective input density at the 256 levels from 0 to 255. The engine information indicates the conditions at the time of engine calibration, and more specifically, indicates sheet type and room temperature. In this case, the engine calibration data obtained in the current operation (the engine calibration data of No. 6) is compared with the engine calibration data stored in the past (the engine calibration data of Nos. 1 to 5), for each of the colors C, M, Y, and K.

As for Cyan, the input-output characteristics of the engine calibration data of No. 6 are represented by a substantially linear shape, and can be determined to be equal to No. 1 and No. 2. Here, the engine information in the engine calibration data of No. 6 shows that the sheet type is plain paper, and the room temperature is 25° C., like the engine information of No. 1. Therefore, the engine calibration data of No. 1 is selected, and the controller calibration data (data surrounded by a thick solid line) stored and associated with the selected engine calibration data is used as the controller calibration data of No. 6.

As for Magenta, the input-output characteristics of the engine calibration data of No. 6 are also represented by a substantially linear shape, and can be determined to be equal to No. 4 and No. 5. Of the data of Nos. 4 and 5, the sheet type and the room temperature of No. 5 are the same as those of No. 6. Accordingly, the engine calibration data of No. 5 is selected, and the controller calibration data (data surrounded by a thick solid line) stored and associated with the selected engine calibration data is used as the controller calibration data of No. 6.

As for Yellow, the input-output characteristics of the engine calibration data of No. 6 are represented by such a shape that the output density is substantially constant in the region where the input density is high, and can be determined to be equal to No. 4. However, the sheet types of No. 4 and No. 6 differ from each other, and therefore, the controller calibration data stored and associated with the engine calibration data of No. 4 cannot be used. For this reason, it is necessary to create new calibration data by printing and measuring a measurement page.

As for Black, the input-output characteristics of the engine calibration data of No. 6 are represented by such a shape that the increase rate (or the slope) of the output density is slightly lower in the region where the input density is high, and can be determined to be equal to No. 5. As the sheet type and the room temperature of No. 5 are the same as those of No. 6, the engine calibration data of No. 5 is selected, and the controller calibration data (data surrounded by a thick solid line) stored and associated with the selected engine calibration data is used as the controller calibration data of No. 6.

The above comparison results show that there is no past data equal to the new engine calibration data with respect to Yellow. Therefore, the result of the determination in S103 is "not equal to past data", and a measurement page is printed and measured for all of the colors C, M, Y, and K (S104). Thus, new controller calibration data for all the colors C, M, Y, and K is created (S105). Here, the newly created controller calibration data of Yellow is equal to the controller calibration data (data surrounded by a thick dot-and-dash line) of Yellow of No. 4. With this result being taken into account, a criterion by which colored paper and plain paper are regarded as equal may be added to the sheet type criteria in the comparisons to be performed thereafter. In a case where this criterion is added, the result of the determination in S103 is "similar to past data". In this case, the controller calibration data stored and associated with the engine calibration data of No. 4 is selected and partially corrected (S107). The partially corrected controller calibration data can be used as new controller calibration data. As a result, the controller calibration data of No. 4 is selected for Yellow (while the controller calibration data of No. 1 is selected for Cyan, and the controller calibration data of No. 5 is selected for Magenta and Black).

When a check is made to determine whether the obtained engine calibration data is equal to the stored engine calibration data, a check may be made to determine whether output densities are equal in all the input density ranges, a check may be made to determine whether output densities are equal in a predetermined input density range, or a check may be made to determine whether output densities are equal at predetermined points (at least input densities of 50% and 100%, for example).

Also, in the above described example, a check is made to determine, for each of the colors C, M, Y, and K, whether the stored engine calibration data includes data equal to the obtained engine calibration data, and the pieces of the controller calibration data stored and associated with the obtained engine calibration data of the respective colors C, M, Y, and K are combined to create new controller calibration data. However, a check may be made to determine whether the stored engine calibration data includes data equal to the obtained engine calibration data of all the colors C, M, Y, and K, and the controller calibration data stored and associated with the data equal to the obtained engine calibration data of all the colors C, M, Y, and K may be used in creating new controller calibration data.

Also, in the above described example, when there is no past data equal to the received engine calibration data with respect to one of the colors, a measurement page on which a measurement pattern is arranged is printed and measured for all the colors. However, a measurement page on which a measurement pattern is arranged may be printed for only the color determined "not to be equal to past data", and the image reading unit 38 of the image forming device 30 or the external scanner 40 may be made to measure the measurement pattern. New controller calibration data may be created in this manner.

Although FIGS. 9A and 9B show engine calibration data in a single image forming device 30, the same control as above can be performed in a case where more than one image forming device 30 is connected to the printing system, and the controller 20 manages the group of image forming devices 30. For example, as shown in FIGS. 10A and 10B, engine calibration data of Nos. 1 to 6 is the engine calibration data of image forming devices 30 (MFPs 1 to 6) independent of one another. When engine calibration data is obtained from a predetermined image forming device 30 (the MFP 6 in this example), the engine calibration data of the predetermined image forming device 30 is compared with the stored past engine calibration data of some other image forming devices 30 (the MFPs 1 to 5 in this example) in S103. In a case where there is no equal engine calibration data with respect to one of the colors (in the case of "not equal to past data" in FIG. 7), controller calibration is performed for all the colors, and new controller calibration data is created. In a case where there is equal engine calibration data with respect to all the colors (in the case of "equal to past data" in FIG. 7), the controller calibration data stored and associated with the engine calibration data of one of the image forming devices 30 is selected, and is used as the controller calibration data to be associated with the engine calibration data of the predetermined image forming device 30. In a case where there is equal engine calibration data with respect to some of the colors while there is similar engine calibration data with respect to some other color (in the case of "similar to past data" in FIG. 7), the controller calibration data stored and associated with the engine calibration data is selected and partially corrected with respect to the some other color, and the resultant controller calibration data is used as the controller calibration data to be associated with the engine calibration data of the predetermined image forming device 30.

Further, as shown in FIGS. 11A and 11B, the same control as above can also be performed in a case where the engine calibration data of two or more image forming devices on different dates is used as the past data.

Next, determination as to whether engine calibration data and engine information are equal is described.

As for calibration data, equality is detected when an output density difference in predetermined input density ranges (input densities of 50% and 100%, for example) in the engine input-output characteristics indicated by engine calibration data is equal to or smaller than a predetermined threshold value. Equality is also detected when the density changes in the input-output characteristics show the same tendencies (the shapes of the graphs indicating the density changes are of the same type, such as linear shapes, quadratic curves, or logarithmic curves). Equality is also detected when the difference between the slopes of the density change graphs (such as coefficients calculated through regression analysis or the like) is equal to or smaller than a predetermined threshold value. Equality is also detected when the correlation coefficient indicating the relationship between the output densities of both sets of engine calibration data is equal to or greater than a predetermined threshold value. In a case where the difference between the maximum densities is equal to or smaller than a predetermined threshold value such as ±0.02, equality is detected when the difference between the slopes calculated in the respective regions obtained by dividing the graphs showing the density changes in the input-output characteristics is equal to or smaller than a predetermined threshold value.

As for sheet types shown in engine information, not only paper sheets of exactly the same sheet type but also colored paper and plain paper are determined to be equal. Further, paper sheets having smaller weights or basis weights than a predetermined threshold value are also determined to be equal. As for room temperatures shown in engine information, room temperatures are determined to be equal when the room temperature difference is lower than a predetermined threshold value such as ±0.5° C. in ordinary temperature environments.

In the above described embodiment, engine information indicates sheet types and room temperatures. However, engine information may indicate the fixing temperatures of the engine and the conveyance speeds, for example, as long as the engine information can be used in comparing the states of the engine with each other. Also, in the above described embodiment, calibration data is of each of the colors C, M, Y, and K (primary colors). However, calibration data may be of a mixed color such as a second- or higher-order color.

As described above, the controller 20 associates engine calibration data obtained from the image forming device 30 with controller calibration data obtained by performing controller calibration, and stores the associated engine calibration data and controller calibration data. When obtaining new engine calibration data, the controller 20 compares the new engine calibration data with the stored engine calibration data, and determines whether the stored engine calibration data includes engine calibration data equal to the newly obtained engine calibration data. If there is no equal engine calibration data, the controller 20 performs controller calibration, and creates the controller calibration data to be associated with the newly obtained engine calibration data. If there is equal engine calibration data, the controller 20 creates the controller calibration data to be associated with the newly obtained engine calibration data, using the controller calibration data stored and associated with the equal engine calibration data. In this manner, the controller 20 can obtain appropriate controller calibration data, without printing and measuring a measurement pattern for performing controller calibration.

The present invention is not limited to the above described embodiment, and any appropriate modifications can be made to the configuration and the control thereof, without departing from the scope of the present invention.

For example, in the above described embodiment, when the entire input-output characteristics of engine calibration data match or are similar, controller calibration data is created with the use of the entire controller calibration data stored and associated with the engine calibration data. However, when only part (such as the region where the input densities are within a predetermined range) of the input-output characteristics of engine calibration data matches or is similar, controller calibration data can be created with the use of only part of the controller calibration data stored and associated with the engine calibration data.

The present invention can be applied to a controller that controls an image forming device that performs calibration, a calibration control program to be executed by the controller, a recording medium storing the calibration control program, and a calibration control method to be implemented in a printing system that includes the image forming device and the controller.

Although embodiments of the present invention have been described and illustrated in detail, the disclosed embodiments are made for purposes of illustration and example only and not limitation. The scope of the present invention should be interpreted by terms of the appended claims.

What is claimed is:

1. A controller in a printing system that includes the controller equipped with an image processor that generates image data for printing by rasterizing a print job, and an image forming device equipped with an engine that performs a printing process in accordance with the image data for printing, the controller and the image forming device each performing calibration to adjust an output of the image forming device, the controller comprising
 a hardware processor that:
  associates first calibration data indicating a result of first calibration performed by the image forming device with second calibration data indicating a result of second calibration performed by the controller in accordance with the first calibration, and stores the first calibration data and the second calibration data into a storage;
  when obtaining the first calibration data of the first calibration performed by the image forming device, compares the obtained first calibration data with the stored first calibration data, and determines whether the stored first calibration data includes data equal to the obtained first calibration data; and,
  when there is no stored first calibration including data equal to the obtained first calibration data, creates the second calibration data to be associated with the obtained first calibration data by performing the second calibration using the controller and storing the second calibration data, and,
  when there is stored first calibration including data equal to the obtained first calibration data, creates the second calibration data to be associated with the obtained first calibration data using the second calibration data stored and associated with the stored first calibration including the data equal to the obtained first calibration data.

2. The controller according to claim 1, wherein
 the controller is connected to a plurality of the image forming devices, and
 the hardware processor associates the first calibration data of the first calibration performed by each of the image forming devices with the second calibration data of the second calibration performed by the controller in accordance with the first calibration performed by each of the image forming devices, and stores the first calibration data and the second calibration data,
 when obtaining the first calibration data of the first calibration performed by a predetermined image forming device, determines whether the stored first calibration data includes data equal to the first calibration data obtained from the predetermined image forming device, and,
 when there is data equal to the first calibration data obtained from the predetermined image forming device, creates the second calibration data to be associated with the first calibration data obtained from the predetermined image forming device, using the second calibration data stored and associated with the stored first calibration including the data equal to the obtained first calibration data.

3. The controller according to claim 1, wherein
the first calibration data and the second calibration data each include information about input-output characteristics of respective colors C, M, Y, and K, and
the hardware processor determines whether the stored first calibration data includes data equal to the obtained first calibration data with respect to all the colors C, M, Y, and K, and
uses the second calibration data stored and associated with data equal to the obtained first calibration data with respect to all the colors C, M, Y, and K.

4. The controller according to claim 3, wherein the hardware processor corrects the second calibration data stored and associated with the stored first calibration including the data equal to the obtained first calibration data with respect to at least one of the colors C, M, Y, and K, and uses the corrected second calibration data.

5. The controller according to claim 1, wherein
the first calibration data and the second calibration data each include information about input-output characteristics of respective colors C, M, Y, and K, and
the hardware processor determines whether the stored first calibration data includes data equal to the obtained first calibration data with respect to each of the colors C, M, Y, and K, and
combines the second calibration data stored and associated with data equal to the obtained first calibration data with respect to the respective colors C, M, Y, and K, and uses the combined second calibration data.

6. The controller according to claim 1, wherein,
when a difference between an output density of the obtained first calibration data and an output density of the stored first calibration data is equal to or smaller than a predetermined threshold value in a predetermined input density range in input-output characteristics of the engine indicated by the first calibration data, the hardware processor determines the obtained first calibration data to be equal to the stored first calibration data.

7. The controller according to claim 1, wherein,
when the obtained first calibration data and the stored first calibration data have the same tendencies in density change in input-output characteristics of the engine indicated by the first calibration data, when a difference between slopes of graphs indicating density changes in the input-output characteristics is equal to or smaller than a predetermined threshold value, or when a correlation coefficient between output densities of both sets of the first calibration data is equal to or greater than a threshold value, the hardware processor determines the obtained first calibration data to be equal to the stored first calibration data.

8. A non-transitory recording medium storing a computer readable calibration control program to be executed by a controller in a printing system that includes the controller equipped with an image processor that generates image data for printing by rasterizing a print job, and an image forming device equipped with an engine that performs a printing process in accordance with the image data for printing, the controller and the image forming device each performing calibration to adjust an output of the image forming device, the calibration control program causing the controller to perform:
a first process including associating first calibration data indicating a result of first calibration performed by the image forming device with second calibration data indicating a result of second calibration performed by the controller in accordance with the first calibration, and store the first calibration data and the second calibration data into a storage;
a second process including comparing the first calibration data of the first calibration performed by the image forming device with the stored first calibration data, and determine whether the stored first calibration data includes data equal to the obtained first calibration data; and
a third process including creating the second calibration data to be associated with the obtained first calibration data by performing the second calibration using the controller and storing the second calibration data when there is no stored first calibration including data equal to the obtained first calibration data, and
creating the second calibration data to be associated with the obtained first calibration data by using the second calibration data stored and associated with stored first calibration including data equal to the obtained first calibration data when there is the stored first calibration including the data equal to the obtained first calibration data.

9. The non-transitory recording medium storing a computer readable calibration control program according to claim 8, wherein the controller is connected to a plurality of the image forming devices,
the first process includes associating the first calibration data of the first calibration performed by each of the image forming devices with the second calibration data of the second calibration performed by the controller in accordance with the first calibration performed by each of the image forming devices, and storing the first calibration data and the second calibration data,
the second process includes obtaining the first calibration data of the first calibration performed by a predetermined image forming device, and determining whether the stored first calibration data includes the data equal to the first calibration data obtained from the predetermined image forming device, and
the third process includes creating the second calibration data to be associated with the first calibration data obtained from the predetermined image forming device by using the second calibration data stored and associated with data equal to the first calibration data obtained from the predetermined image forming device, when there is the data equal to the first calibration data obtained from the predetermined image forming device.

10. The non-transitory recording medium storing a computer readable calibration control program according to claim 8, wherein the first calibration data and the second calibration data each include information about input-output characteristics of respective colors C, M, Y, and K,
the second process includes determining whether the stored first calibration data includes data equal to the obtained first calibration data with respect to all the colors C, M, Y, and K, and the third process includes using the second calibration data stored and associated with data equal to the obtained first calibration data with respect to all the colors C, M, Y, and K.

11. The non-transitory recording medium storing a computer readable calibration control program according to claim 8, wherein the first calibration data and the second calibration data each include information about input-output characteristics of respective colors C, M, Y, and K,
the second process includes determining whether the stored first calibration data includes data equal to the obtained first calibration data with respect to each of the colors C, M, Y, and K, and
the third process includes combining the second calibration data stored and associated with data equal to the obtained first calibration data with respect to the respective colors C, M, Y, and K, and using the combined second calibration data.

12. The non-transitory recording medium storing a computer readable calibration control program according to claim 10, wherein the third process includes correcting the second calibration data stored and associated with the stored first calibration including the data equal to the obtained first calibration data with respect to at least one of the colors C, M, Y, and K, and using the corrected second calibration data.

13. The non-transitory recording medium storing a computer readable calibration control program according to claim 8, wherein the second process includes determining the obtained first calibration data to be equal to the stored first calibration data when a difference between an output density of the obtained first calibration data and an output density of the stored first calibration data is equal to or smaller than a predetermined threshold value in a predetermined input density range in input-output characteristics of the engine indicated by the first calibration data.

14. The non-transitory recording medium storing a computer readable calibration control program according to claim 8, wherein the second process includes determining the obtained first calibration data to be equal to the stored first calibration data when the obtained first calibration data and the stored first calibration data have the same tendencies in density change in input-output characteristics of the engine indicated by the first calibration data, when a difference between slopes of graphs indicating density changes in the input-output characteristics is equal to or smaller than a predetermined threshold value, or when a correlation coefficient between output densities of both sets of the first calibration data is equal to or greater than a threshold value.

15. A calibration control method to be implemented in a printing system that includes a controller equipped with an image processor that generates image data for printing by rasterizing a print job, and an image forming device equipped with an engine that performs a printing process in accordance with the image data for printing, the controller and the image forming device each performing calibration to adjust an output of the image forming device, the calibration control method comprising:
a first process including associating first calibration data indicating a result of first calibration performed by the image forming device with second calibration data indicating a result of second calibration performed by the controller in accordance with the first calibration, and store the first calibration data and the second calibration data into a storage;
a second process including comparing the first calibration data of the first calibration performed by the image forming device with the stored first calibration data, and determine whether the stored first calibration data includes data equal to the obtained first calibration data; and
a third process including creating the second calibration data to be associated with the obtained first calibration data by performing the second calibration using the controller and storing the second calibration data when there is no stored first calibration including data equal to the obtained first calibration data, and
creating the second calibration data to be associated with the obtained first calibration data by using the second calibration data stored and associated with stored first calibration including the data equal to the obtained first calibration data when there is the stored first calibration including the data equal to the obtained first calibration data, the controller performing the first process, the second process, and the third process.

16. The calibration control method according to claim 15, wherein
the controller is connected to a plurality of the image forming devices,
the first process includes associating the first calibration data of the first calibration performed by each of the image forming devices with the second calibration data of the second calibration performed by the controller in accordance with the first calibration performed by each of the image forming devices, and storing the first calibration data and the second calibration data,
the second process includes obtaining the first calibration data of the first calibration performed by a predetermined image forming device, and determining whether the stored first calibration data includes the data equal to the first calibration data obtained from the predetermined image forming device, and
the third process includes creating the second calibration data to be associated with the first calibration data obtained from the predetermined image forming device by using the second calibration data stored and associated with data equal to the first calibration data obtained from the predetermined image forming device, when there is the data equal to the first calibration data obtained from the predetermined image forming device.

17. The calibration control method according to claim 15, wherein
the first calibration data and the second calibration data each include information about input-output characteristics of respective colors C, M, Y, and K,
the second process includes determining whether the stored first calibration data includes data equal to the obtained first calibration data with respect to all the colors C, M, Y, and K, and
the third process includes using the second calibration data stored and associated with data equal to the obtained first calibration data with respect to all the colors C, M, Y, and K.

18. The calibration control method according to claim 15, wherein
the first calibration data and the second calibration data each include information about input-output characteristics of respective colors C, M, Y, and K,
the second process includes determining whether the stored first calibration data includes data equal to the obtained first calibration data with respect to each of the colors C, M, Y, and K, and
the third process includes combining the second calibration data stored and associated with data equal to the obtained first calibration data with respect to the respective colors C, M, Y, and K, and using the combined second calibration data.

19. The calibration control method according to claim 17, wherein the third process includes correcting the second calibration data stored and associated with the stored first calibration including the data equal to the obtained first calibration data with respect to at least one of the colors C, M, Y, and K, and using the corrected second calibration data.

20. The calibration control method according to claim 15, wherein the second process includes determining the obtained first calibration data to be equal to the stored first calibration data when a difference between an output density of the obtained first calibration data and an output density of the stored first calibration data is equal to or smaller than a predetermined threshold value in a predetermined input density range in input-output characteristics of the engine indicated by the first calibration data.

21. The calibration control method according to claim 15, wherein the second process includes determining the obtained first calibration data to be equal to the stored first calibration data when the obtained first calibration data and the stored first calibration data have the same tendencies in density change in input-output characteristics of the engine indicated by the first calibration data, when a difference between slopes of graphs indicating density changes in the input-output characteristics is equal to or smaller than a predetermined threshold value, or when a correlation coefficient between output densities of both sets of the first calibration data is equal to or greater than a threshold value.

* * * * *